United States Patent [19]

Gibert

[11] 4,106,084

[45] Aug. 8, 1978

[54] MEANS FOR CONTROLLING THE ELECTRIC CURRENT DENSITY OF A HIGH TENSION DIRECT CURRENT SOURCE

[75] Inventor: Alain Gibert, Gan, France

[73] Assignee: Societe Nationale des Petroles d'Aquitaine, Courbevoie, France

[21] Appl. No.: 647,086

[22] Filed: Jan. 7, 1976

[30] Foreign Application Priority Data

Jan. 10, 1975 [FR] France .............................. 75 00644

[51] Int. Cl.² ................................................ H02M 3/335
[52] U.S. Cl. ........................................ 363/21; 363/97
[58] Field of Search ..................... 321/2, 18, 21, 15; 331/117; 363/18–21, 96, 97

[56] References Cited

U.S. PATENT DOCUMENTS

| | | | |
|---|---|---|---|
| 3,790,878 | 2/1974 | Brokaw | 321/2 X |
| 3,840,797 | 10/1974 | Aggen et al. | 321/2 |
| 3,893,006 | 7/1975 | Algeri et al. | 321/15 X |
| 3,928,793 | 12/1975 | Waltz | 363/19 |
| 3,986,085 | 10/1976 | Weber | 321/15 X |

Primary Examiner—William M. Shoop
Attorney, Agent, or Firm—Burgess, Ryan and Wayne

[57] ABSTRACT

In a current-density controlled source of high-voltage current fed from a low-voltage current source and supplying a high-voltage direct current to two output terminals, an error voltage resulting from the comparison of a constant reference voltage and the voltage appearing at the terminals of a resistor through which flows a current proportional to the current to be controlled acts on the amplitude of an alternative current signal produced by an oscillator, the amplitude variations of the signal produced by said oscillator causing the amplitude high voltage current supplied to said output terminals to vary.

1 Claim, 2 Drawing Figures

MEANS FOR CONTROLLING THE ELECTRIC CURRENT DENSITY OF A HIGH TENSION DIRECT CURRENT SOURCE

The present invention is related to means for controlling the electric current density of a high tension direct current source.

The problem of controlling the current density delivered by a source of energy is a well known problem in the field of electronics, where it is often required to have sources capable of delivering currents with a constant current density, even under conditions wherein the load fed by said sources is variable. These sources are conventionally designated by the term of "current generators" on account of the constant current density they deliver.

With a view to obtaining a constant current density in the outlet circuits of said current sources, various control means are conventionally used.

One particularly efficient known method of controlling the current density of an electric current source consists essentially in arranging a resistor R in the output circuit of the current generator in such a manner that the current to be controlled flows through said resistor. The voltage resulting at the terminals of said resistor R is picked up and compared to a constant reference voltage. In the ideal case of operation with a constant current density, these two compared voltages would be equal, i.e. the differential or error voltage would be nil. Since the current to be controlled is not constant when said control is not effected, the voltage between the terminals of the resistor R will vary, and the comparison of this voltage to the reference voltage results in a variable voltage, or error voltate $\epsilon$. This error voltage $\epsilon$, is applied e.g. to a control input of an active circuit, such as a transistor, contributing to the establishment of the output power. The variations of $\epsilon$ with respect to zero — which is the ideal valve — are thus compensated by said active circuit. The voltage between the terminals of the resistor T, and consequently the current flowing through said resistor, are thus stabilized.

This efficient method of control, which is comparatively simple as regards its practical application, is practically not applicable when the current source to be controlled is a source that must produce, at its output terminals, a very high direct current voltage, e.g. a voltage on the order of several kilovolts.

In fact in the known current sources with current density output regulation or control operating according to the above described principle, two quasi-impossibilities appear as soon as the voltage of the direct current delivered by the source becomes too high.

On the one hand the error tension (or voltage) $\epsilon$ of these current sources acts directly, as indicated hereinabove, on the output voltage, e.g. through an amplifying transistor. This is possible only when that voltage is not too high. Indeed the active circuits adapted to act on the output voltage have only a capacity of several hundreds of Volts when transistors are involved. As regards the operational amplifiers which are also used in this kind of current sources, these amplifyers have only a capacity of several dozens of Volts.

On the other hand the resistor R provided for controlling the current output is connected, in these known current sources, in the output circuit and the tension between its terminals will be extremely high when the output tension itself is very high. Such high voltage is difficult to compare efficiently to a comparatively low reference voltage; indeed a given error value which has a substantial effect at a low voltage level will become less effective as the voltage level increases.

The present invention is aimed at providing a direct current source producing a current of controlled intensity to an abosrber circuit the load of which is variable, by means of a novel control circuit.

It is an object of the invention to provide a controlled current generator having a low-voltage current source and producing at the terminals of an output circuit a high-voltage direct current, wherein the error voltage resulting from the comparison of a constant reference voltage and the voltage at the terminals of a resistor R through which flows a current proportional to the current to be controlled acts on the amplitude of an alternative signal produced by an oscillator, the amplitude variations of the signal produced by said oscillator causing the amplitude of the high voltage delivered at the terminals of said output circuit to vary.

Thus due to this novel principle of counter-reaction the error signal acts on a signal of comparatively small amplitude, which controls the oscillations of the oscillator, but not on a high-voltage signal, i.e. on the output signal.

According to another feature of the invention the resistor R which is used to establish the voltage compared to the reference voltage is not connected directly in the high-voltage output circuit, but in the circuit of the secondary winding of a transformer the primary winding of which constitutes the inductor coil of the oscillating circuit of the oscillator, and the secondary winding of which is connected to a voltage multiplier feeding a rectifying and filtering circuit which constitutes said current density controlled high-voltage output circuit.

Other features and advantages of the invention will appear in the description herein after referring to the appended drawings which show an embodiment of the instant invention by way of illustration, but not of limitation.

FIG. 1 shows the various components of a controlled current generator according to the invention which is supplied with a low-voltage direct current of e.g. −24 Volts.

Figure 1:
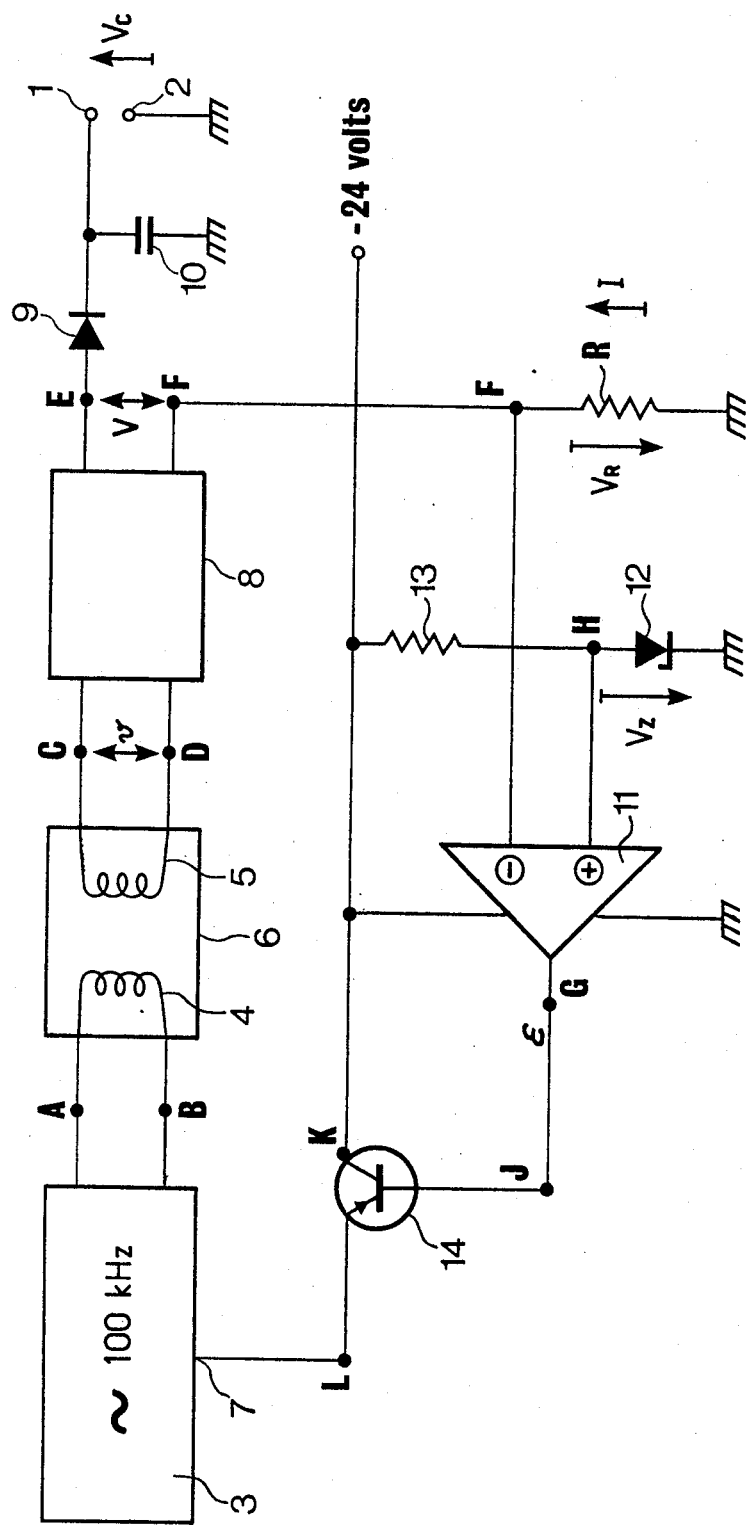
FIG. 1 is a simplified synoptical diagram representing a high-voltage current density controlled current source according to the present invention.

The very high voltage direct current (THT) $V_c$ is produced at the outlet terminals 1 and 2, one of which constitutes the reference potential or neutral point of the circuit. This voltage $V_c$ is obtained from an electronic oscillator 3 supplying terminals A and B with an alternative voltage of a frequency of e.g. 100 kHz. As will be described herein below with reference to FIG. 2, this oscillator is connected to the primary winding 4 of a transformer 6 the secondary winding 5 of which at its terminals C and D an alternative voltage $v$. The amplitude of the voltage delivered by the oscillator 3 and consequently the amplitude of the voltage $v$ are defined, as will be explained herein after, by the amplitude of a control signal applied to a control terminal 7 of the oscillator.

The voltage produced between terminals C and D is applied to the input terminals of a conventional voltage multiplier 8. This voltage multiplier delivers at its outlets, i.e. at terminals E and F, an alternative voltage $V = k \cdot v$, $k$ being the multiplying coefficient of multiplier 8. This voltage V the amplitude of which, as that of voltage $v$, is a function of the control signal applied to the input terminals 7 of oscillator 3, is then rectified and filtered in a conventional rectifying cell comprising e.g. a diode and a condenser 10, so as to provide the voltage THT at terminals 1 and 2.

As regards the current density control of the direct current signal source $V_c$ which is implemented as described herein before, this control is effected by varying the input voltage of oscillator 3 in the manner described herein below.

A resistor through which flows a current I proportional to the current to be controlled, i.e. proportional to the current provided by the generator or source to an absorber circuit connected to output terminals 1 and 2, is connected between the output point F of multiplier 8 and the ground. The voltage $V_R$ produced at F by current I flowing through R is applied to one of the input terminals of a conventional operational amplifier 11. The other input terminal of said amplifier 11 is supplied with the reference voltage $V_Z$ provided at H by a Zener diode 12 conveniently polarized by the low-voltage source (−24 Volts), through the intermediary of a polarizing resistor 13.

The output terminal G of this amplifier supplies a voltage $\epsilon$ or error voltage defined by the following equation:

$$\epsilon = V_Z - V_R$$

This error voltage the variations of which are representative of the variations of the current I to be controlled, is applied to the base J of a ballast transistor 14 the collector of which is connected at K to the low-voltage supply and the emitter of which is connected at L to amplitude control terminal 7 of oscillator 3. The base voltage, which is the error voltage 2, controls the emitter voltage of transistor 14 and thus varies the supply voltage of oscillator 3.

Consequently when the current to be controlled varies, $V_R$ will vary; the error voltage $\epsilon$ represents the variations with respect to the constant value of $V_Z$ and causes the amplitude of the oscillations of oscillator 3 to vary correspondingly; these variations result in variations of v and V, and consequently of $V_c$, which latter variations compensate the variations of the current to be controlled and tend to confer a constant value to $V_R$.

As already briefly stated, the controlled current generators according to the invention can deliver very high tensions $V_c$. Indeed the error voltage $\epsilon$ does not act directly on the output voltage $V_c$ but acts on the supply voltage of the oscillator 3, i.e. on a low voltage.

Figure 2:
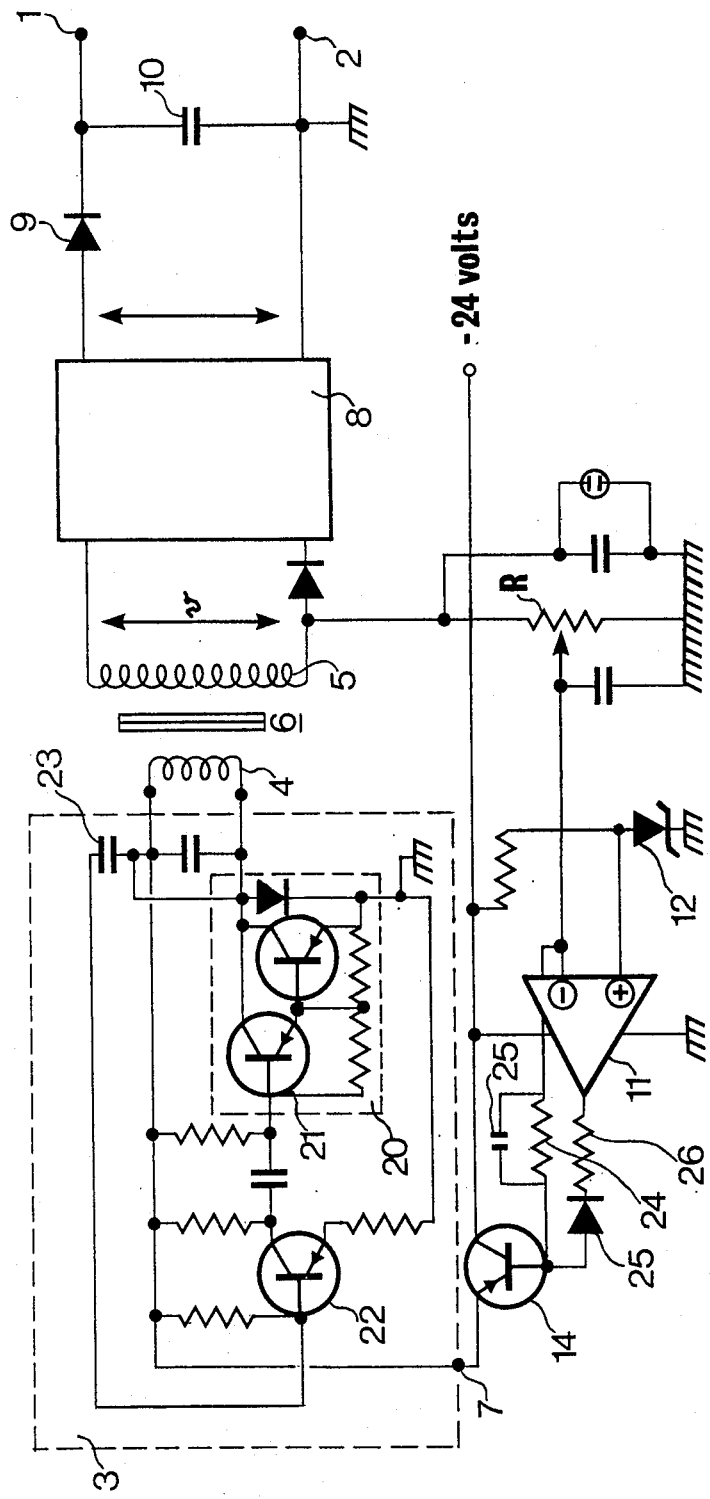
FIG. 2 is a diagram of the device according to the invention corresponding to the synoptical view of FIG. 1 and showing in a more detailed manner one embodiment of the counter-reaction circuit and the oscillator on which the said circuit is adapted to act.

In FIG. 2 wherein identical components are designated by the same reference numerals as those used in FIG. 1, shows a certain number of elements in a more detailed manner. The operation of the device is, of course, the same as herein above described.

Oscillator 3 is a LC oscillator the inductance L of which is constituted by the primary winding 4 of the transformer. The tuned circuit LC constitutes the absorbing circuit with respect to a Darlington power circuit 20 which is known per se. The base 21 of the input transistor of said Darlington circuit is supplied by a pre-amplifying phase shifting stage comprising a single transistor 22, with a non-decoupled resistor.

The reaction giving rise to the oscillations is obtained simply by a condenser 23 connected between the base of transistor 22 and the collector of the second transistor of the Darlington circuit 20.

The oscillator operates at a fixed frequency, e.g. 100 kHz. The amplitude of the oscillations is transmitted to the terminals of the induction winding 4 and is a function of the supply voltage of the oscillator, which voltage is determined, in turn, at 7 by transistor 14 which receives the error voltage produced by the operational amplifier 11. This amplifier operates as a high-gain amplifier, due to a counter-reaction resistor 24 having a high resistance (e.g. 20 MΩ) shunted by a condenser 25 having a low capacity.

The error voltage $\epsilon$ is applied to the base of transistor 14 through a protecting diode 25 and a resistor having a low resistance and adapted to limit the output current of amplifier 11.

The output stage is constituted by the secondary winding of the voltage-multiplying transformer 6 which is connected to the voltage multiplier 8 followed by the rectifying cell 9, 10.

The resistor R used for controlling the current is constituted by a potentiometer connected between one terminal of the secondary winding of the transformer 6 and the ground, a condenser of high capacity being connected in parallel with said potentiometer. The sliding contact of the potentiometer constitutes point F of FIG. 1 and is connected to one of the two input terminals of operational amplifier 11.

The advantage of the potentiometer resides in that it enables the user to choose the value of the current to be controlled by determining the position of the sliding contact.

It should be noted that in such a current-density controlled generator according to the invention, the secondary winding (high voltage winding) of the transformer 6 being isolated from the direct current potentials of the low voltage supply, it is possible to avoid connecting the "low point" of the above mentioned secondary winding to the ground without incurring any disadvantage. Due to this arrangement the control resistor (or potentiometer) R may be connected in the ground circuit. The voltage $V_R$ applied to one of the two input terminals of amplifier 11 may thus have a very small value, which constitutes another advantage of the invention, as already mentioned herein before.

What is claimed is:

1. A current regulated with high voltage power supply, comprising:
   a transformer having a low voltage primary winding and a high voltage secondary winding:
   a current sampling circuit coupled to said secondary winding for providing a first D.C. voltage dependent upon the current flowing through said secondary winding:
   rectifying and filtering means for coupling said secondary winding to a high voltage load:
   means for comparing said first voltage with a reference voltage to produce a current control signal at a control terminal thereof which varies in accordance with the difference between said first and reference voltages;

a transistor oscillator having at least one power supply terminal and including a resonant circuit having inductive and capacitive elements, the primary winding of said transformer comprising the inductive element of said resonant circuit, said oscillator including a transistor amplifier having an output terminal DC coupled to said resonant circuit and an input terminal coupled to said resonant circuit via a feedback capacitor connected between said input terminal and said power supply terminal, the current through said primary and secondary windings being dependent upon the amplitude of oscillations developed by said oscillator; and a variable transistor power supply circuit including a variable impedance control transistor having two main electrodes coupled in series between a fixed voltage supply terminal and said power supply terminal and a control electrode coupled to said control terminal for varying the supply voltage to said oscillator in accordance with said current control signal to thereby vary the amplitude of said oscillations so as to maintain the current flowing through said secondary winding at a desired value.

* * * * *

UNITED STATES PATENT OFFICE
CERTIFICATE OF CORRECTION

Patent No. 4,106,084      Dated August 8, 1978

Inventor(s) Alain Gibert

It is certified that error appears in the above-identified patent and that said Letters Patent are hereby corrected as shown below:

Column 1, line 35:  Change "voltate" to --voltage--.

Column 1, line 39:  Change "valve" to --value--.

Column 1, line 63:  Change "amplifyers" to --amplifiers--.

Column 2, line 8:   Change "abosrber" to --absorber--.

Column 4, line 53:  Cancel "with".

Signed and Sealed this

First Day of May 1979

[SEAL]

Attest:

RUTH C. MASON
Attesting Officer

DONALD W. BANNER
Commissioner of Patents and Trademarks